United States Patent
Dame

[15] 3,667,339
[45] June 6, 1972

[54] FRICTION CONTROLLED TORQUE FASTENING

[72] Inventor: Richard E. Dame, 12625 Billington Road, Silver Spring, Md. 20904

[22] Filed: Mar. 30, 1971

[21] Appl. No.: 129,545

[52] U.S. Cl. .................................................. 85/61
[51] Int. Cl. ............................................... F16b 31/02
[58] Field of Search ............................. 85/61, 62, 45

[56] References Cited

UNITED STATES PATENTS

| | | | |
|---|---|---|---|
| 3,191,486 | 6/1965 | Gibbens | 85/61 |
| 3,267,792 | 8/1966 | Yackle | 85/61 |

FOREIGN PATENTS OR APPLICATIONS

| | | | |
|---|---|---|---|
| 258,472 | 9/1926 | Great Britain | 85/61 |
| 660,630 | 4/1963 | Canada | 85/61 |

Primary Examiner—Marion Parsons, Jr.
Attorney—John N. Randolph

[57] ABSTRACT

A friction controlled torque threaded fastening which depends upon the static coefficient of friction between contacting surfaces of two parts of the fastening and the normal forces which retain said surfaces in engagement with one another. The two parts comprise an inner section or core having a threaded portion and an outer section or shell. The shell has a cylindrical bore of a diameter less than the diameter of a peripheral surface of circular cross section of the core which is applied to the bore by a shrink fit connection. The shell and core are formed of the same material so that the connection can be accomplished by heating the shell and cooling the core.

2 Claims, 7 Drawing Figures

PATENTED JUN 6 1972 3,667,339
FIG.1.
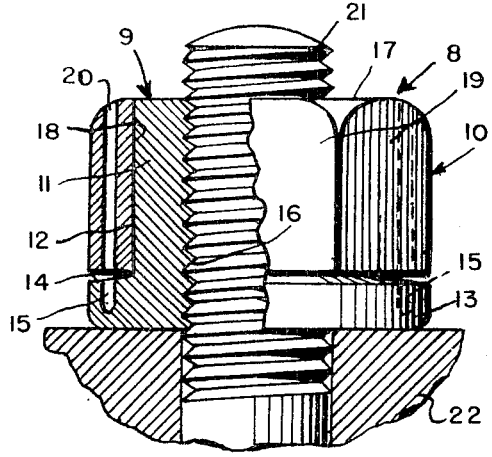
FIG. 2.
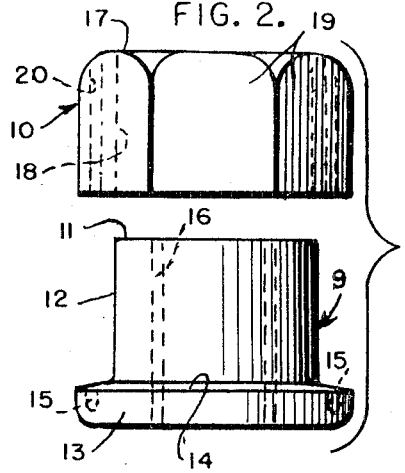
FIG. 3.
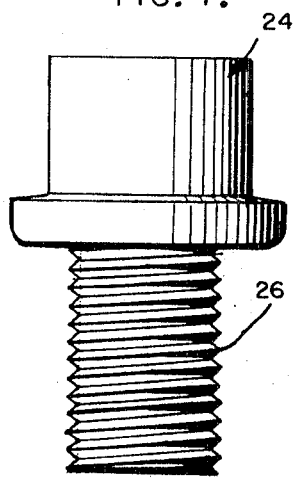
FIG. 4.
FIG.5.
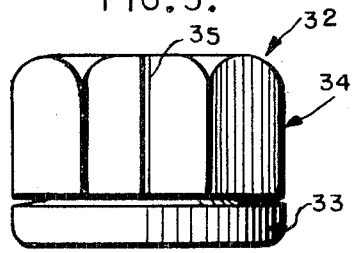
FIG. 6.
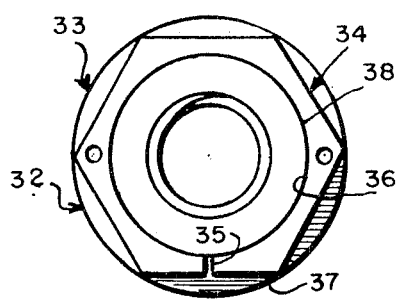
FIG.7.
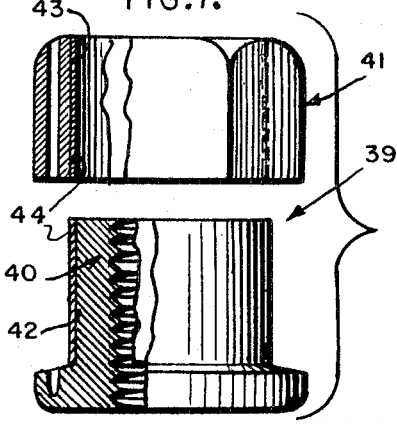
INVENTOR
RICHARD E. DAME
BY John N. Randolph
ATTORNEY 3,667,339

FRICTION CONTROLLED TORQUE FASTENING

SUMMARY

It is a primary object of the present invention to provide a friction controlled torque fastening adapted for use in all environments where torque must be controlled, such as, in connection with internal combustion engine heads, pre-loaded bolts and tie rods for aircraft, aerospace and space structures, as well as other applications where it is desirable to limit the tightening forces involved in bolting structures together.

It is a primary object of the present invention to provide such a fastening wherein forces will develop along the friction-surface-interface between the two parts of the fastening to produce a desired torque limit that can be applied to an inner part by the application of a turning force to the outer part.

A further object of the invention is to provide a fastening which is reusable and not damaged by the application of an excessive torque causing slippage between the fastening parts.

Another object of the invention is to provide a fastening having means for securing the parts together to enable an excessive torque to be applied to the inner part to effect removal of the fastening where necessary.

A further object of the invention is to provide a fastening which may be economically manufactured and wherein the torque control may be predetermined.

Various other objects and advantages of the invention will hereinafter become more fully apparent from the following description of the drawing, illustrating presently preferred embodiments thereof, and wherein:

BRIEF DESCRIPTION OF THE DRAWING

FIG. 1 is a fragmentary view, partly in section and partly in elevation, illustrating one embodiment of the threaded fastening;

FIG. 2 is an exploded elevational view of the two parts of the fastening of FIG. 1;

FIG. 3 is a view similar to FIG. 1 illustrating another embodiment of the fastening;

FIG. 4 is an elevational view of one of the two parts of the fastening of FIG. 3;

FIG. 5 is an elevational view of a third embodiment of the threaded fastening;

FIG. 6 is a top plan view thereof, and

FIG. 7 is an exploded view, partly in elevation and partly in section, of a fourth embodiment of the fastening.

DESCRIPTION OF THE PREFERRED EMBODIMENTS

Referring more specifically to the drawing and first with reference to FIGS. 1 and 2, the friction controlled torque fastening as illustrated therein and designated generally 8, comprises a nut consisting of an inner section or core 9 and an outer section or shell 10.

The core 9 comprises a body 11 having a peripheral surface 12 of a circular cross section extending from one end thereof to an enlargement or flange 13 which is provided at the opposite end of the body 11 and which has an inner annular surface 14 which is disposed at an angle greater than 90° to the surface 12. The flange 14 is provided with one or more sockets 15 which open through the surface 14, for a purpose which will hereinafter be described. The body 9 has a axial threaded bore 16 which is concentrically disposed relative to the surface 12.

The outer section or shell 10 comprises a sleeve 17 having a bore 18 of a diameter less than the diameter of the peripheral surface 12. The exterior of the body 17 is provided with wrench lands or flats 19, and said body 17 has a bore or bores 20 extending longitudinally therethrough, between its bore 18 and certain of the wrench lands 19, and which are capable of aligning with the sockets 15, as seen in FIG. 1.

The core 9 and shell 10 are formed of the same material, which may be steel, brass, aluminum, titanium, plastic, or the like. To assemble the core 9 and shell 10, the shell is heated and the core is cooled. Thermal expansion of the shell 10 and contraction of the core 9 will permit the shell 10 to be applied over the core 9, as illustrated in FIG. 1. Thereafter, when the parts 9 and 10 reach the same temperature, forces will develop along the friction-surface-interface as provided by the contacting surfaces 12 and 18 which will retain said surfaces in frictional engagement with one another.

FIG. 1 shows the nut 8 applied to the threaded end 21 of a bolt which extends through a part 22 of a structure to be secured together. The nut 8 is tightened by a wrench or other turning tool, not shown, applied to the wrench lands 19. However, the friction-surface-interface 12,18 will allow only a predetermined torque to be applied to the core 9, so that if the torque applied to the shell 10 exceeds this limit, the shell will turn relative to the core to prevent excessive tightening of the nut 8. As seen in FIG. 1, the inclined flange surface 14 does not contact the shell 10 so as not to increase the frictional engagement between the core 9 and shell 10.

Since the torque applied in tightening the nut 8 is limited, the maximum torque that can be applied to the nut 8 without turning the shell 10 relative to the core 9 should be sufficient for removing the nut from the threaded bolt end 21. However, if the nut is left in place for a considerable period of time, rust or corrosion or other factors may result in the nut binding with the bolt end 21 or with part 22, so that a torque greater than the maximum torque limit of the nut is required for unscrewing the nut. Should this occur, a pin or pins, not shown, may be applied to the aligned bores 20 and sockets 15 for securing the shell to the core so that sufficient torque can be applied to the shell to turn the core.

FIGS. 3 and 4 illustrate another embodiment of the fastening, designated generally 23, and comprising a core 24 and shell 25. The parts 24 and 25 constitute a bolt head and the core 24 has a threaded shank 26 extending from its inner end and which replaces the threaded bore 16. The core 24 otherwise corresponds with the core 9, and the shell 25 corresponds with the shell 10 and is assembled on the core 24 in the same manner as heretofore described in connection with the nut 8.

Shank 26 is shown extending through a bore 28 and threadedly engaging in a bore 29 of parts 30 and 31, respectively, to be secured together by the bolt 23. It will be readily apparent that the torque which can be applied to the bolt 23 is limited in the same manner as the torque which can be applied to the nut 8, so that if an excessive torque is applied to the shell 25, it will turn relative to the core 24.

FIGS. 5 and 6 illustrate another embodiment of the invention in the form of a nut 32 having a core 33 corresponding with the core 9 and a shell 34. The shell 34 differs from the shell 10 only in that it is provided with a narrow slit or slot 35 which extends from end-to-end thereof and between its bore 36 and one of the wrench lands 37, so that the shell 32 may be sprung outwardly to enlarge the bore 36 sufficiently so that it can be applied over the peripheral surface 38 of the core 34, without heating the shell and cooling the core. The assembled nut 32 will function in the same manner as the nut 8.

FIG. 7 illustrates a fourth embodiment of the fastening comprising a nut 39 having a core 40 and shell 41, corresponding to the core 9 and shell 10. The nut 39 differs from the nut 8 in that the peripheral surface 42 of the core 40 and the cylindrical bore 43 of the shell 41 are each provided with a tin coating 44 which may be of a plastic material, such as teflon. The shell 41 is assembled on the core 40 by heating the shell and cooling the core, in the same manner that the shell 10 is assembled on the core 9. The two contacting coatings 44 will provide the friction-surface-interface of the nut 39 limiting the amount of torque which can be applied to the core 40 by the shell 41.

It will be readily apparent that various other shapes may be applied to the exterior of the shell of each embodiment to accommodate other types of torque imparting tools, and various other modifications and changes are contemplated and may be resorted to without departing from the function or scope of the invention.

I claim as my invention:

1. A friction controlled torque fastening comprising an inner section or core and an outer section or shell, said core having a threaded part and being provided with a peripheral surface of circular cross section, said shell having a substantially cylindrical bore of a diameter less than the diameter of the peripheral surface and engaging around said peripheral surface to provide a static coefficient of friction between the bore and said surface for limiting the torque which can be applied to the core by the shell, said shell and core being formed of the same material whereby the shell may be thermally expanded and the core thermally contracted for assembling the shell on the core, said core having an enlargement disposed beyond one end of said peripheral surface forming a flange having an inner surface inclined to form an angle greater than 90° with said peripheral surface, spaced from and out of engagement with the shell.

2. A fastening as in claim 1, said flange having at least one socket opening through said inner surface, and said shell having a bore extending longitudinally therethrough and capable of being aligned with said socket for receiving a pin for securing the shell non-rotatively to the core.

* * * * *